Feb. 13, 1934.  C. W. LEGUILLON ET AL  1,947,270
APPARATUS FOR INSERTING CURING BAGS IN TIRES
Filed Dec. 29, 1932   3 Sheets-Sheet 1
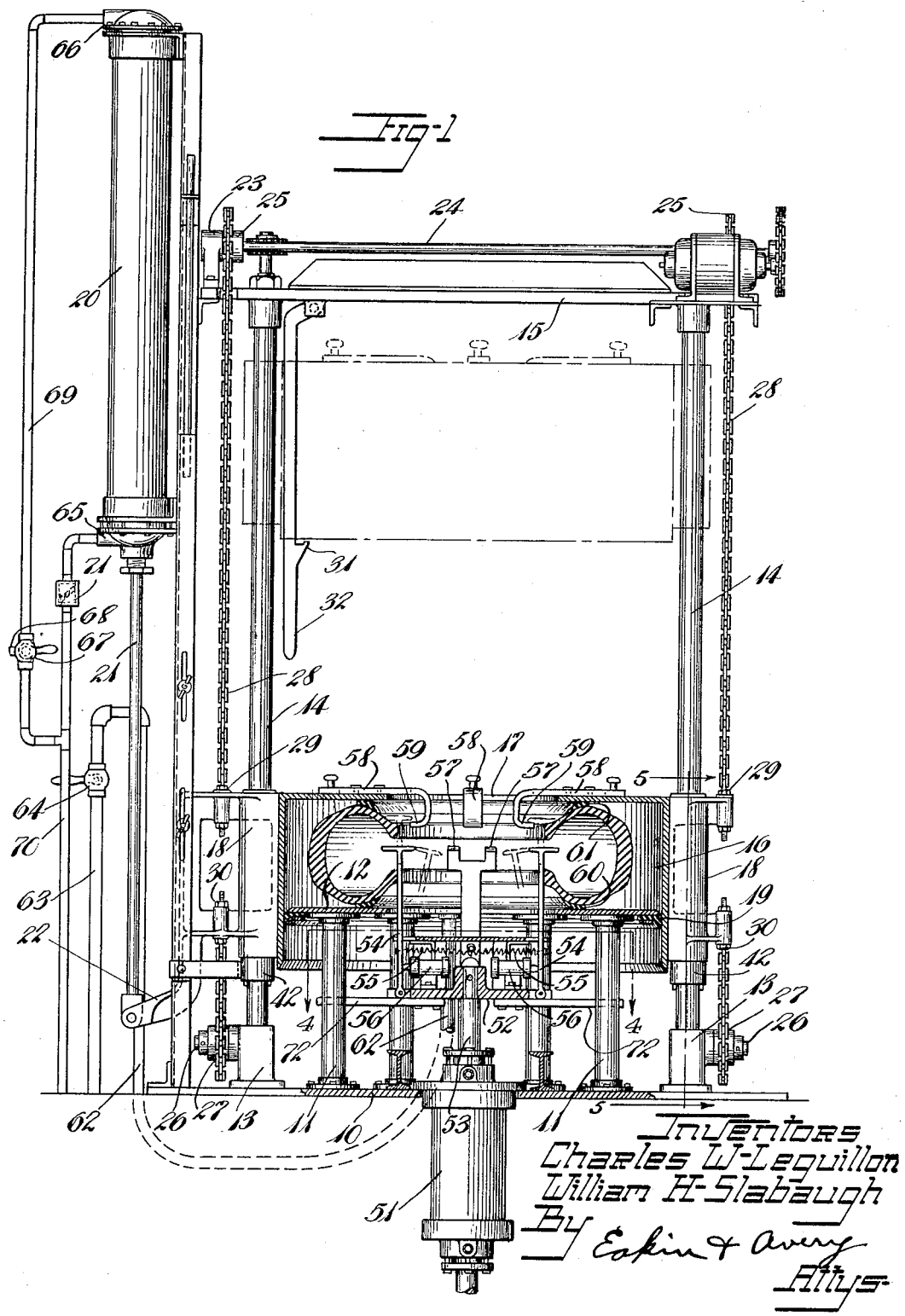
Inventors
Charles W. Leguillon
William H. Slabaugh
By Eakin & Avery
Attys

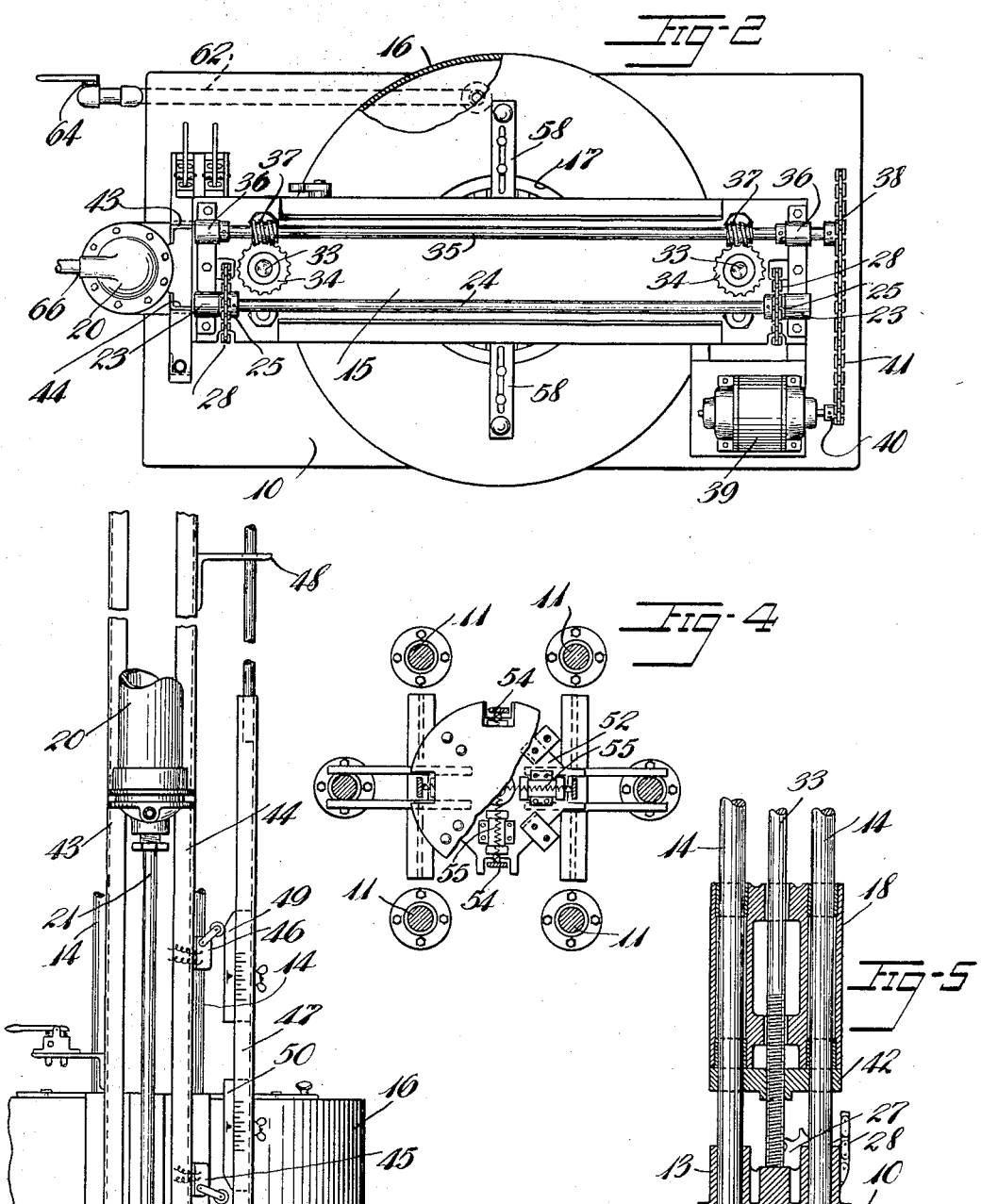

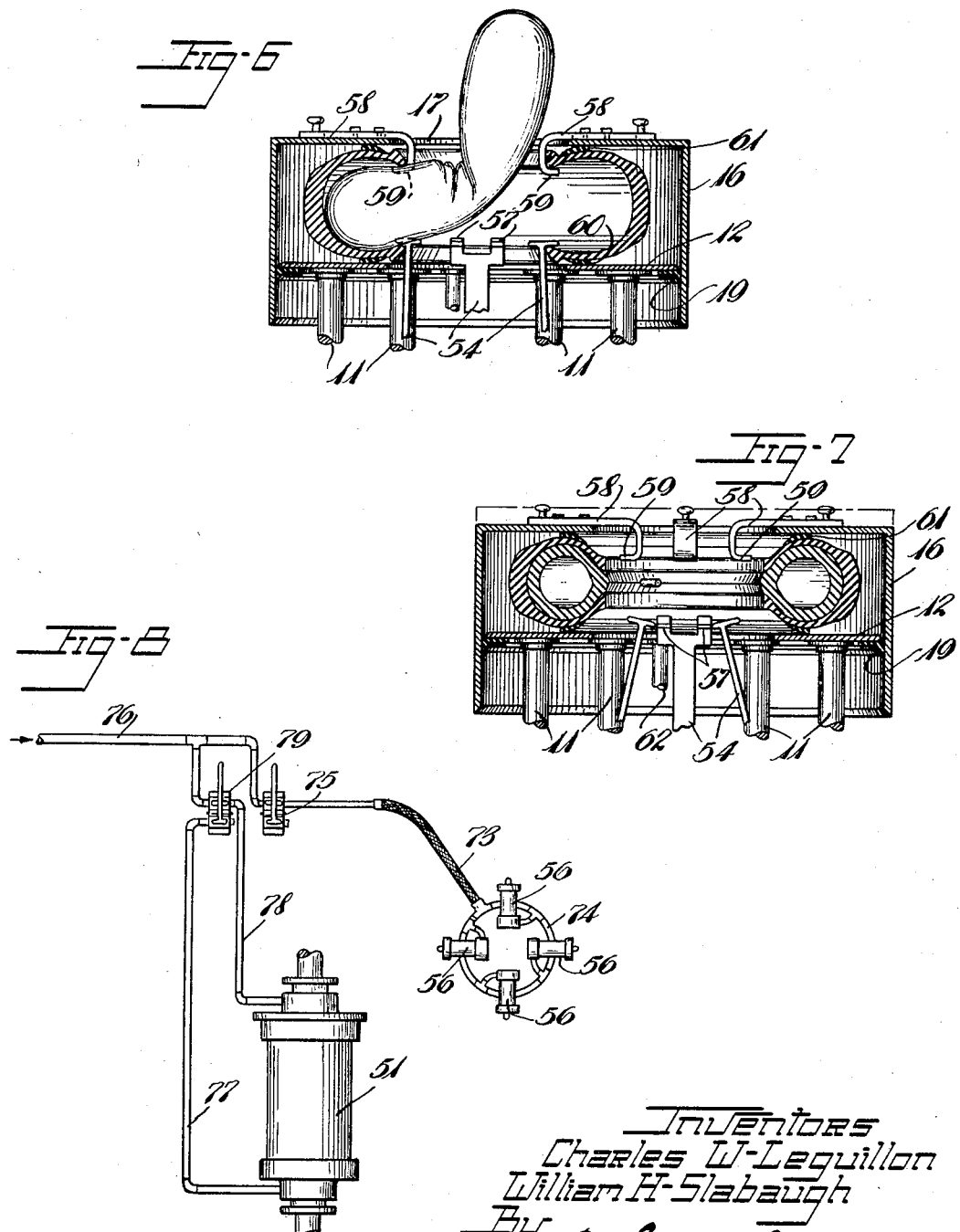

Patented Feb. 13, 1934

1,947,270

UNITED STATES PATENT OFFICE 1,947,270

APPARATUS FOR INSERTING CURING BAGS IN TIRES

Charles W. Leguillon, Akron, and William H. Slabaugh, Cuyahoga Falls, Ohio, assignors to The B. F. Goodrich Company, New York, N. Y., a corporation of New York Application December 29, 1932
Serial No. 649,244

9 Claims. (Cl. 18—2)

This invention relates to apparatus for inserting curing bags in tires and is especially useful for manipulating uncured tires of large cross section and of small bead diameter when curing bags are to be inserted therein.

In the manufacture of pneumatic tire casings comprising cords or cord fabric it has been customary to build the tires smaller than the molds in which the tires are vulcanized and to expand the tires into mold contact by the use of curing bags made of pliable and resilient rubber. The bags themselves are made smaller than the inside dimensions of the tire casing but during continued use, the same bag being used in the vulcanization of a great many tires, the bags become permanently stretched so that the bag may have a greater circumference than the inside of the vulcanized and unstretched tire. This difficulty causes the bag to buckle or form an inwardly directed wrinkle in its outer surface which if allowed to remain will form a ridge on the inside of the tire casing. As the tendency in the design during recent years has been toward the production of tires of larger cross-section and in the case of tires for use on buses to tires of relatively large diameter and great cross-section, the difficulty of properly inserting the bags has increased. As such tires are relatively stiff and unyielding and the bags used therein are relatively heavy, a great amount of labor is necessary in the operation of inserting the bags and it has been only by considerable manipulation including prying and pounding of the bag into place while holding the beads of the tire separated by chain tackle, that proper insertion of the bags is accomplished.

Such large tires usually have a relatively small bead opening and must be built on collapsible cores, the difference between the tread diameter and bead diameter of the tires being too great to permit use of the drum building method. The beads are very stiff and the force necessary to separate the beads to insert a bag is relatively great.

The principal objects of the present invention are to reduce cost of the insertion of such curing bags, to provide for expansion of the tire to assist in insertion of the bag, to eliminate defects in the tire, and to provide for the insertion of bags in tires of different sizes.

Other objects will appear from the following description and the accompanying drawings.

In the drawings:

Fig. 1 is a front elevation of the device partly in section showing a tire in place therein.

Fig. 2 is a plan of the device, the tire chamber being partly broken away.

Fig. 3 is a side elevation taken from the left of Fig. 1, parts being broken away.

Fig. 4 is a section on line 4—4 of Fig. 1, parts being broken away.

Fig. 5 is a sectional detail view taken on line 5—5 of Fig. 1.

Fig. 6 is a vertical mid-section of the tire chamber with a tire therein, showing the bag being inserted in the tire.

Fig. 7 is a view similar to Fig. 6 but showing the bag completely inserted and the beads released.

Fig. 8 is a detail diagram of the control cylinders and piping located at the base of the device.

Referring to the drawings, the device comprises a base plate 10 on which are mounted columns 11 which support an annular ring table 12. Socketed frame members 13, also secured to plate 10, embrace the lower extremities of four guide rods 14 which have their upper extremities fixed to a cross frame member 15. To provide means for expanding the tire casing circumferentially by differential pressure, a cylinder box 16 open at the bottom and closed at the top, except for a central opening 17, is provided with ears 18 adapted to slide on guide rods 14. A flexible gasket 19, around the edge of table 12 extends therefrom to meet the cylindrical walls of the box 16 in sealing engagement therewith.

To provide means for raising the box from operative position without increasing the height of the device to such extent as to prevent its use in a room of ordinary height, a vertically disposed cylinder 20, fixed to the frame of the device, is provided with a piston and a piston rod 21, the lower end of which is pinned to a bracket 22 fixed to the box 16, the arrangement being such that the box 16 may be raised to the dot and dash line position shown in Fig. 1. Brackets 23, mounted on frame member 15 are provided with journals for a horizontal shaft 24 having sprockets 25 fixed thereto. Brackets 13 are provided with horizontal studs 26 on which are journaled sprockets 27. Chains 28 are engaged around sprockets 25 and 27 and have their ends fixed, as at 29 and 30, to ears 18, thereby providing for equalization of movement.

A safety catch 31 on a lever 32 suspended from frame 15 is adapted to prevent the box 16 from dropping in case of failure of the fluid pressure in cylinder 20.

In order to provide for accurate adjustment of the box during the insertion of the bag and independent of the elevating means just described, a pair of vertically disposed feed screws 33 are journaled in frame member 15 and have worm gears 34 fixed thereto. A horizontal shaft 35, journaled in pedestal bearings 36 fixed to frame member 15, has worms 37 fixed thereon to engage worm gears 34 to drive the feed screws in unison. A sprocket 38 fixed to shaft 35 is adapted to be driven from a reversible electric motor 39 by a pinion 40 and chain 41 and thereby provide means for driving the feed screws in either direction.

A pair of cross-heads 42, slidably mounted on guide rods 14, are threaded to engage screws 33 below ears 18 on the box 16 and to support the same at such elevation as may be desirable for any particular sized tire.

To provide means for automatically setting the elevation of the box 16 at different steps of the operation by control of the motor 39, a pair of vertical frame members 43, 44, which serve to support cylinder 20, are fixed to base plate 10 and frame member 15. A pair of cam-operable electric circuit breakers 45, 46, are mounted on frame member 44 and are electrically connected to control the circuit which operates motor 39. A rod 47 has its lower end fixed to an adjacent cross head 42 and is slidably mounted in a guide 48 fixed to frame member 44. A pair of cams 49, 50, are adjustably mounted on rod 47. Rod 47 is graduated to indicate cross sectional widths of tires. The arrangement is such that movement of the cross head 42 by motor 39 is only possible between limits set by the location of cams 49 and 50.

To provide means for initially centering the tire and for manipulating and holding the beads thereof, a fluid pressure cylinder 51 is mounted in a central opening in the base 10. A plate 52 fixed to the piston rod 53 is adapted to be raised and lowered by fluid pressure in the cylinder. A plurality of combined pushing and pulling elements 54 are pivoted to plate 52 and opposite elements are held toward each other by springs 55. A plurality of fluid pressure cylinders 56 are mounted on plate 52, one for each combined pushing and pulling element. Each cylinder 56 is adapted to force its corresponding element radially against the tension of springs 55. Each element 54 is bifurcated to provide a pair of spaced fingers 57 adapted to hook over the lower bead of the tire or to push against the upper bead as desired.

Radially and slidably mounted on the top of box 16 are a plurality of slides 58 each having an underturned end 59 for engaging under the upper bead of the tire to hold the upper bead in sealing engagement with the box 16.

The tire casing is shown in Fig. 1 as placed on table 12 with the box 16 lowered thereover. Table 12 is provided with a resilient sealing ring 60 and box 16 is provided with a similar sealing ring 61. These rings are adapted to seal the chamber formed by the table 12 and box 16 and the wall of the tire. A pipe 62 connects the chamber to a vacuum line 63 by means of a hand operated valve 64.

To provide for quickly raising the box 16 to its inoperative position, and for checking its descent when released, by a single mechanism, cylinder 20 is provided with ports 65 and 66 at its lower and upper ends. Port 66 is connected to a three-way valve 67 having an exhaust opening 68 and a pressure supply 70 by a pipe 69. The pressure supply is connected at all times with the port 65 through a check valve 71. The check valve 71 prevents rapid flow of fluid from the port 65, limited flow being provided by a small opening through the check, and permits rapid flow from the supply 70 to port 65. The arrangement is such that when valve 67 is operated to connect supply 70 to port 66 pressure at each end of the cylinder 20 is balanced and box 16 will descend under the influence of gravitational forces, the check valve 71 permitting the box to descend at a velocity governed by the size of the small opening therethrough. When valve 67 is turned to connect port 66 to exhaust 68, check valve 71 opens and box 16 is raised.

Guides 72 fixed to plate 52 slidably engage columns 11 and prevent rotation of plate 52.

Cylinders 56 which move the lower hook members laterally, are single acting and are connected to be operated in unison. A flexible tube 73 connects a manifold 74 in communication with the cylinders 56 to a manually operable three-way valve 75 by means of which the cylinders may be supplied from a pressure main 76 or connected to the atmosphere.

Cylinder 51, which raises and lowers the lower hook members, is of the double-acting type and pipes 77 and 78 connect the ports in its lower and upper ends to a four-way valve 79 by which the opposite ends of the cylinder may be manually connected to the pressure main 76 or to the atmosphere alternately.

The operation of the device is as follows: Assuming that the unvulcanized tire casing has been built upon a collapsible core which has been removed therefrom leaving the tire in approximately the shape of the core as illustrated in Fig 1, the box 16 being raised to the dot and dash line position, and fingers 57 being lowered and slides 58 placed at their innermost positions, the tire is placed upon the table 12. Fingers 57 are now raised by admitting pressure fluid to the lower end of cylinder 51 and are independently forced outwardly by admitting pressure fluid to cylinders 56. This action centers the tire on the table. The cams 49 and 50 are set to correspond with the size of the tire. Motor 39 is started in a direction to raise cross heads 42 to adjust the resting position of box 16 for the initial operation. The cross heads are raised until cam 49 operates circuit breaker 46 and stops the motor. Box 16 is now permittted to descend to its initial operating position over the tire by admitting fluid under pressure to the upper end of cylinder 20, the box coming to rest on the cross heads 42.

Fingers 57 are now raised and contacting with the upper bead of the tire force it up to such a position that the hooked ends of slides 58 may be engaged thereunder. Slides 58 are manually operated to hook them under the upper bead.

Fingers 57 are then lowered while still pressed outwardly by the cylinders 56. They engage the lower bead which is thereby forced downwardly, thereby increasing the spacing of the beads.

The air or water bag which has been folded in substantially figure 8 shape is now entered through opening 17 into the interior of the tire. At this point the chamber formed by cooperation of the box 16 and table 12 with the tire may be evacuated through pipe 62 thereby stretching the casing diametrically to permit the bag to expand into full contact with the tire without buckling, air being forced into the bag for expanding the same and, as the tire is expanded by the differential pressure, motor 39 is energized to cause it to rotate in such a direction as to lower cross heads 42, the box 16 following the cross heads downwardly and the bead spacing being correspondingly reduced to normal. When cam 50 engages circuit breaker 45, motor 39 stops. The device is now in the position shown in Fig. 7, (the lowering of the box being indicated by the dot and dash lines) and slides 58 and fingers 57 are moved inwardly to release the beads.

The vacuum is now broken by admitting air to the chamber and cylinder 20 is operated to raise box 16 to the dot and dash position of Fig. 1. The tire is now removed.

The device may also be used for bagging and forming drum built tires where the beads are of such diameter as to fit within the gaskets 60 and 61 and to be retained by the inwardly projecting edges of the table 12 and box 16. In bagging such tires the box 16 may be lowered as previously described as vacuum is applied to form the tire and as the tendency of the bead portions is to stand apart the hooks 59 and fingers 57 need not be used, but the fingers 57 may be manipulated to assist in forcing the bag into place in the tire.

We claim:

1. Apparatus for inserting curing bags in tires, said apparatus comprising a table for supporting a tire, means cooperating with the tire and the table to form an annular chamber around the tire, means for holding the beads of the tire apart, and means for subjecting the walls of the tire to differential pressure to expand the same.

2. Apparatus for inserting curing bags in tires, said apparatus comprising means for applying suction to the outer surface of the tire to expand the same and means for holding the beads of the tire in extended spaced relation while the tire is being so expanded.

3. Apparatus for inserting curing bags in tires, said apparatus comprising a vacuum box adapted to enclose the outer wall of the tire, means for centering a tire therein, and means for forcing the beads of the tire apart to permit insertion of the bag.

4. Apparatus for inserting curing bags in tires, said apparatus comprising a vacuum box adapted to enclose the outer wall of the tire and having a movable wall, a pair of resilient gaskets attached to said box, one of said gaskets being mounted upon the movable wall, and means for maintaining sealing engagement of said gaskets with the wall of a tire as the tire is expanded circumferentially and reduced in width.

5. Apparatus for inserting curing bags in tires, said apparatus comprising a vacuum box adapted to enclose the outer wall of the tire, and a plurality of fingers extending therein and adapted to separate the beads of the tire.

6. Apparatus for inserting curing bags in tires, said apparatus comprising an annular vacuum box adapted to enclose the outer wall of the tire, a plurality of bead-manipulating arms extending therein, means for moving said arms axially of said box, and means independent of the means for causing the axial movement for moving said arms radially of said box.

7. Apparatus for inserting curing bags in tires, said apparatus comprising a vacuum box adapted to enclose the outer wall of the tire to expand the tire, means for clamping a bead of the tire to a wall of the box, and means for forcing the bead into position to be clamped.

8. Apparatus for inserting curing bags in tires, said apparatus comprising a vacuum box adapted to enclose the outer wall of a tire to expand the tire, a set of clamping members for clamping a bead of the tire to a wall of said box, means for projecting said clamping member into said box, means independent of said projecting means for spreading said members to contact with a bead of the tire, and means to draw said members toward the wall of the box.

9. Apparatus for inserting curing bags in tires, said apparatus comprising an annular box adapted to enclose the outer wall of a tire and having a movable sidewall, means carried by opposite walls of the box for sealing the sidewall of a tire thereto, means for holding the beads of the tire in widely spaced relation with the side walls of the tire engaging said sealing means, means for evacuating the box to circumferentially stretch the tire as the bag is inserted therein, and means for moving said movable side wall to reduce the spacing of the beads as the tire is circumferentially stretched.

CHARLES W. LEGUILLON.
WILLIAM H. SLABAUGH.